United States Patent Office 2,891,929
Patented June 23, 1959

2,891,929

POLYESTERS OF A GLYCOL, A DICARBOXYLIC ACID AND AN AMINOACID

John R. Caldwell and Russell Gilkey, Kingsport, Tenn., assignors to Eastman Kodak Company, Rochester, N.Y., a corporation of New Jersey No Drawing. Application March 31, 1954
Serial No. 420,194

3 Claims. (Cl. 260—75)

This invention relates to polymeric materials, and particularly to fiber-forming linear polymers having improved dyeing properties.

A large number of synthetic linear condensation polymers are known to the art, and such polymers are ordinarily prepared by reacting a polybasic organic acid with a polyhydric alcohol, with or without the use of a condensation catalyst. The high molecular weight products which are thereby obtained are capable of being drawn into oriented fibers of the type described in U.S. Patent 2,071,250. The usual polyester fibers, such as those prepared from polyethylene terephthalate, are very difficult to dye, however, and special methods are usually employed in order to achieve any satisfactory degree of dyeing. Thus, at the present time, polyester fibers must be dyed at super atmospheric pressures with cellulose acetate dyes in order to obtain practical shades. This process requires the use of expensive equipment and is time consuming. An alternative process which has been used involved effecting the dyeing in the presence of a dye assistant or swelling agent such as phenol, cresol, benzoic acid, dichlorobenzene, or similar material. This process suffered the disadvantage, however, of often causing non-uniform swelling of the fiber with a resultant non-uniform application of the dye. Furthermore, most of the dyeing assistants were objectionable to use because of expense, toxicity, objectionable odor, or similar disadvantage.

It is accordingly an object of this invention to provide new linear polyesters from which fibers can be prepared which have improved dye affinity, especially for cellulose acetate type dyes and acid wool dyes.

Another object of the invention is to provide new and improved linear polyesters containing a dialkylamino aromatic dibasic acid in the main molecular chain.

Another object of the invention is to provide new and improved polyesters suitable for the manufacture of fibers which can be dyed to practical shades under ordinary conditions with or without the use of super atmospheric pressures or dyeing assistants.

Another object of the invention is to provide a method for incorporating a dialkylamino aromatic dibasic acid or ester into high molecular weight, fiber-forming polyesters.

Another object of the invention is to improve the dyeing properties of polyester fibers without substantially altering the melting point, tensile strength, elongation, or elastic recovery of the fibers.

Other objects will be apparent from the description and claims which follow.

These and other objects of the invention are accomplished by reacting together a dihydroxylic compound, such as a dihydric alcohol or an ester thereof, a polycarboxylic compound, such as a polybasic organic acid or an ester thereof, and a dialkylamino aromatic dibasic acid, or an ester thereof, containing at least one aromatic nucleus bearing at least one and not more than two carboxylic groups and a single dialkylamino group in which the alkyl groups are either methyl or ethyl, and thereby forming a linear polyester of improved dyeing properties. The coreaction of polyhydroxylic and polycarboxylic compounds, whether free or esterified, to form linear condensation polymers, is well known in the art. This invention is concerned with obtaining modified condensation polymers of improved dyeing properties by coreacting with any of the well known combinations of dihydroxylic and polycarboxylic compounds, a dialkylamino aromatic dibasic acid or ester as defined herein whereby the dialkylamino compound enters into the polymer chain in the same manner as does the polycarboxylic component to give a modified molecular structure which is much more readily dyed than are the unmodified polyesters. As is well known in the art, the polyhydric alcohols and polybasic acids can be used in either the free or esterified form without affecting the polyester formation and it will be understood that the term "dihydroxylic compound" as used herein is intended to include both the free alcohols and their esters, and the term "polycarboxylic compound" is intended to include the free acids and their esters.

The terpolymers of high molecular weight which are thus obtained can be drawn into oriented fibers which have improved affinity for dyes, and particularly for cellulose acetate type dyes. The modified polyesters prepared in accordance with this invention retain the desirable physical and chemical properties of the polyesters usually prepared by coreacting the polyhydric alcohol and the polybasic organic acid, and in addition have the improved properties imparted by the presence of the dialkylamino aromatic dibasic acid groups in the main molecular chain.

The terpolymers of this invention are conveniently prepared by heating a mixture of the polybasic acid, preferably in ester form, polyhydric alcohol, and a dialkylamino aromatic diacid as herein defined and either free or esterified, at atmospheric pressure, and preferably in the presence of a suitable condensation catalyst such as an amphoteric metal compound. The condensation reaction is desirably effected under an atmosphere of nitrogen and at a temperature of from about 150 to 300° C., and preferably from about 200 to 300° C. The condensation reaction is carried out until the product has a sufficiently high molecular weight to exhibit fiber-forming properties. The fiber-forming stage can be checked by touching the molten polymers with a rod and drawing the rod away. When the fiber-forming stage has been reached, a continuous filament of considerable strength will be pulled from the melt in this manner. This stage is generally reached when the polymer has an intrinsic viscosity of at least 0.4, the intrinsic viscosity being defined as $$\frac{\log_e N_r}{C}$$

in which $N_r$ is the viscosity of a dilute solution of the polymer in m-cresol divided by the viscosity of m-cresol in the same units and at the same temperature, and $C$ is the concentration in grams of polymer per 100 cc. of solution. Measurement of the intrinsic viscosity is generally the most convenient method for following the course of the reaction. In most cases, it is usually desirable to continue the reaction until the intrinsic viscosity is above 0.4, and preferably above 0.6. The polymers thus obtained have excellent fiber-forming and cold drawing properties in addition to high melting points, tensile strength, elongation and elastic recovery. These polymers are crystalline, linear polymers which can be formed into fibers which are oriented along their axis.

In practicing the invention, any of the dialkylamino aromatic dibasic acid compounds can be used which have at least one aromatic nucleus substituted with at least one and not more than two carboxylic groups and a single dialkylamino group in which the alkyl groups are either methyl or ethyl. Thus the dialkylamino aromatic dibasic acid compounds can be mononuclear compounds having two carboxylic groups and a dialkylamino group on a single aromatic ring; or unfused binuclear or polynuclear compounds, preferably having a single carboxylic group and a dialkylamino group on one aromatic nucleus and another carboxylic group with or without a dialkylamino group on another aromatic nucleus. The dialkylamino aromatic dibasic acid or ester is preferably employed in an amount of from about 5 to about 25% and preferably from about 10 to about 16 mole percent in the polyester. Since these compounds function as dibasic acids, they can be used to replace a part of the polybasic acid ordinarily employed if desired. Since the modifier enters directly into the molecular structure, a fundamentally modified linear polyester is obtained which is unlike the modified polyesters obtained by reacting a modifying material with an already polymerized polyester.

The dialkylamino compounds employed in practicing the invention include mononuclear compounds having two carboxylic groups and a single dialkylamino group and having the formula

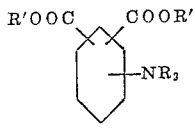

wherein R is either a methyl or an ethyl group and R' is either hydrogen or an alkyl group from 1 to 10 carbon atoms; and unfused dinuclear compounds of the formula

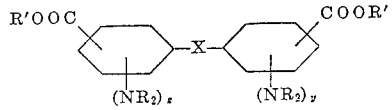

wherein $y$ and $z$ are either 0 or 1, at least one of $y$ and $z$ being 1, R is either methyl or ethyl, R' is either hydrogen or an alkyl group of from 1 to 10 carbon atoms, and X is either a direct bond between the benzene rings or a $-CH_2-$, $-O-$, $-CH_2-CH_2-$, $-\underset{CH_3}{CH}-CH_2-$, $-\underset{CH_3}{CH}-$ $-O-CH_2-CH_2-O-$, $-SO_2-$, $-S-$, $-\langle\phantom{x}\rangle-$ $-\underset{CH_3}{N}-$, or $-CF_2-$ group The dialkylamino compounds are typified by, but not limited to, phthalic acid derivatives of the formula

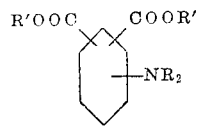

such as 2-dimethylaminoterephthalic acid, 5-dimethylamino isophthalic acid, 6-diethylamino isophthalic acid, 3-dimethylamino-O-phthalic acid, 4-diethylamino-O-phthalic acid and esters of these and similar phthalic acid derivatives; bicyclic compounds of the formula

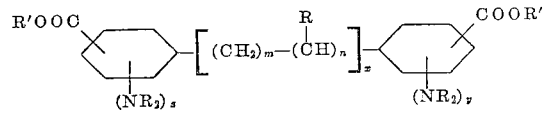

in which $m$, $n$, and $x$ are either 0 or 1 and $y$, $z$, R and R' have the value set out hereinabove, such as 4,4'-dicarboxy-2,2'-dimethylamino diphenyl methane, 4,4'-dicarboxy-2,2'-dimethylamino diphenyl ethane, 3,3'-dicarboxy-4,4'-diethylamino-diphenyl methyl methane; 4,4'-dicarboxy-3,3'-dimethyl-amino-diphenyl isopropane, and esters of these and similar compounds, including the diphenyls of the formula

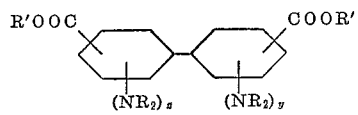

such as 4,4'-dicarboxy-2-dimethylamino diphenyl and the like; substituted sulfones of the formula

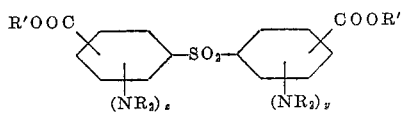

such as 3,3'-dicarboxy-4,4'-dimethylamino-diphenylsulfone, 4,4'-dicarboxy-3,3'-dimethylamino-diphenylsulfone, 4,4'-dicarboxy-2,2'-diethylamino-diphenylsulfone and esters of these and similar substituted diphenylsulfones; substituted diphenyl sulfides of the formula

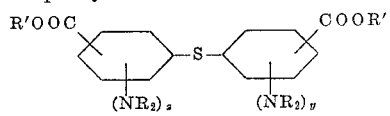

such as 4,4'-dicarboxy-3,3'-diethylamino-diphenylsulfide, 4,4'-dicarboxy-3,3'-dimethylamino-diphenyl sulfide, and esters of these and similar substituted diphenyl sulfides; as well as compounds of the formula

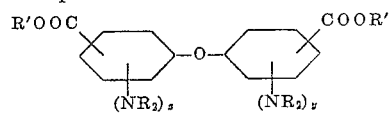

such as 4,4'-dicarboxy-3,3'-diethylamino-diphenyl ether and the like; and

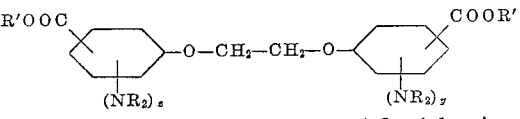

In these and similar compounds as defined herein, the dialkylamino group can be located in any of the positions ortho, meta or para to a carboxyl group, and it will be understood that all such isomers are included within the scope of the invention. In the compounds containing two aromatic rings, the carboxyl groups are located in positions either meta or para to the linking group X, and the dialkylamino groups can be in any of the ring positions.

In practicing the invention, the dialkylamino compound is coreacted with a polybasic organic acid, or an ester thereof, and with a polyhydric alcohol which can be in the form of the free alcohol or esterfied as described hereinafter. The reaction is desirably effected in the presence of a condensation catalyst and preferably an organo-metallic catalyst, a large number of which are described in the copending applications of John R. Caldwell, Serial Nos. 313,061 through 313,071 inclusive, filed October 3, 1952, now U.S. Patents 2,744,089–97, 2,744,078 and 2,744,129. The catalysts which are preferred for use in practicing this invention are the titanium compounds specifically disclosed in application Serial No. 313,072, now U.S. Patent 2,720,502, tin compounds as disclosed in application Serial No. 313,078, now U.S. Patent 2,720,507, and aluminum compounds as disclosed in application Serial No. 313,077, now U.S. Patent 2,720,506. When such catalysts are employed in preparing the polyester, the esterified polybasic acids and esterified polyhydric alcohols can be readily used instead of the free acids and free polyhydric alcohols. It will, therefore, be understood that this invention includes the use of such acids and alcohols in the form of their esters as well as in the unesterified form, and includes the use of any condensation catalysts or no catalyst in accordance with usual practices.

Thus in practicing the invention any of the well known polybasic organic acids, and particularly the dibasic dicarboxylic acids can be employed for preparation of the modified polymers. These acids include the aliphatic dibasic acids or esters thereof of the formula $$R_1OOC-R_2-COOR_3$$

wherein $R_1$ and $R_3$ are either hydrogen or alkyl radicals containing from 1 to 10 carbon atoms, and $R_2$ is an aliphatic hydrocarbon radical. Thus typical aliphatic dibasic dicarboxylic acids which can be employed include oxalic acid, succinic acid, adipic acid, sebaccic acid, α,α-dimethyl glutaric acid, dimethyl malonic acid, diglycollic acid, β-oxydipropionic acid, γ-oxydibutyric acid, maleic acid, fumaric acid, itaconic acid, and similar well known aliphatic dibasic acids. The acids of this type which are preferred are those containing at least 6 carbon atoms. The esters of such acids can also be used, and the alkyl esters wherein each alkyl group contains from 1 to 10 carbon atoms are desirably employed.

The invention is advantageously carried out employing an aromatic dicarboxylic acid or a diester thereof of the formula $$R_1OOC-R_2-X-R_3-COOR_4$$

wherein $R_1$ and $R_4$ each represents hydrogen or an alkyl radical containing from 1 to 10 carbon atoms and $R_2$ and $R_3$ each represents $(CH_2)_{n-1}$, wherein $n$ is an integer of from 1 to 5 inclusive, and X represents a divalent aromatic radical of the formula

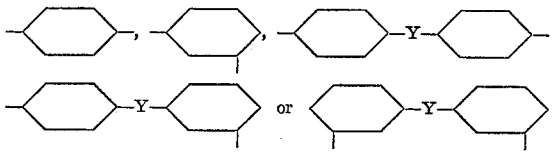

Y representing a radical of the formula

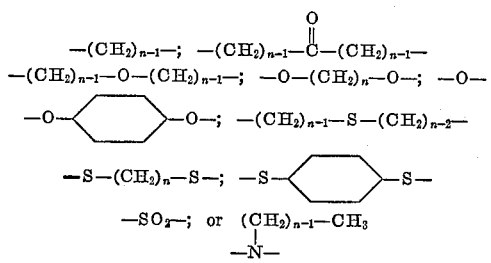

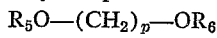

Of such acids, p,p'-sulfonyldibenzoic acid, terephthalic acid, 1,2-di(p-carboxyphenoxy) ethane, 1,2-di(p-carboxyphenyl) ethane and p,p'-diphenic acid are preferred, although any of the other acids or esters of such acids can be employed with good results.

The polyhydric alcohol or ester thereof is preferably an alpha, omega-dioxy compound having the formula $$R_5O-(CH_2)_p-OR_6$$

wherein $p$ is an integer of from 2 to 12 inclusive, and $R_5$ and $R_6$ each represents either a hydrogen atom, or an acyl radical containing from 2 to 4 carbon atoms. The polyhydric alcohols which are preferably employed in practicing the invention are the glycols which are commonly used in the preparation of polyesters such as ethylene glycol, trimethylene glycol, tetramethylene glycol, pentamethylene glycol, hexamethylene glycol, heptamethylene glycol, octamethylene glycol, and similar well known polymethylene glycols. The branched-chain glycols such as 2-methyl-pentanediol and 3-methyl-hexanediol can also be used. Other glycols which are suitable include the ether glycols such as diethylene glycol. Thus it is apparent that the dihydroxy compounds used in practicing this invention need not be the free hydroxy compounds when a catalyst of the organo-metallic type is employed to promote the polyester formation. The polyhydric alcohol or ester thereof is desirably employed in an amount such that there is an excess of hydroxy or substituted hydroxy radicals over the amount of carboxyl groups in the polybasic acid or esters and the dialkylamino acids employed in the reaction. Generally speaking, the hydroxyl groups are desirably present in an amount of from about 1.3 to about 3 times the amount of carboxyl groups, although excess amounts of as much as 10 times or more can be employed in some cases.

It is thus apparent that the dialkylamino aromatic dibasic acids described herein can be used for preparing any high molecular weight, high melting linear polyester having fiber-forming properties. For example, the aromatic dicarboxylic acids or diesters thereof which are preferably employed include such materials as β-hydroxyethyl diesters of p,p'-sulfonyldibenzoic acid, p,p'-sulfonyldibenzoic acid dibutyl esters, m,p'-sulfonyldibenzoic acid dipropyl esters, m,m'-sulfonyldibenzoic acid dihexyl esters, methyl terephthalate, hexyl terephthalate, isopropyl terephthalate, and various other esters having the following formulas:

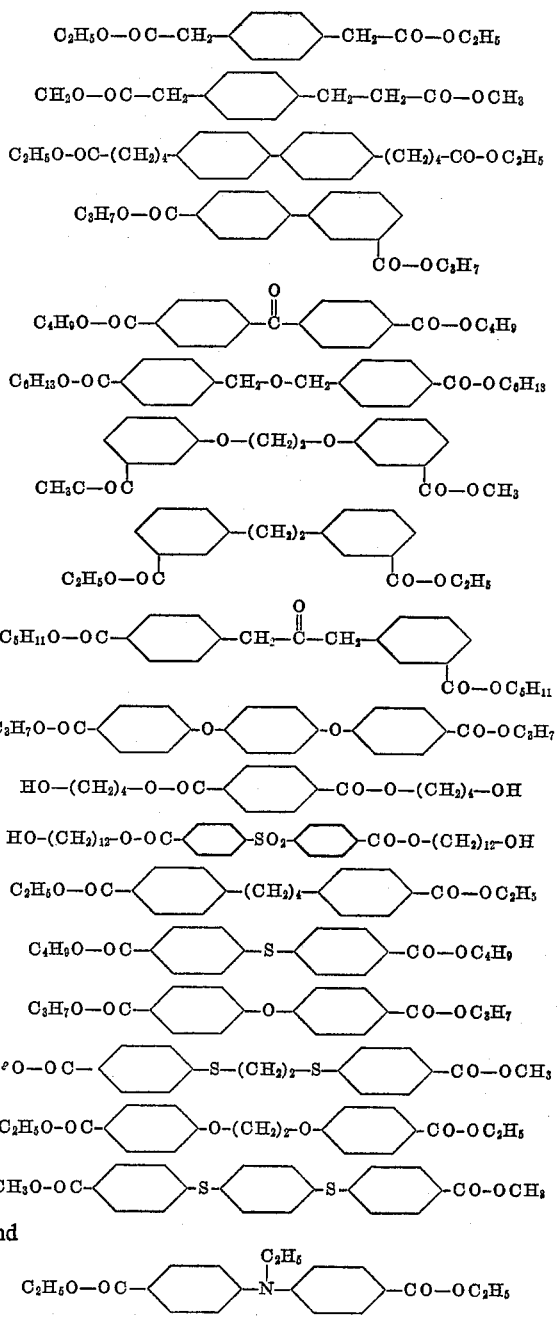

and as well as the corresponding free acids.

The dihydroxy compounds which are preferably employed are the straight-chain alkane diols, i.e. the polymethylene glycols, wherein the hydroxy radicals are positioned at the two ends of the alkylene chain. As was indicated, the mono- or diesters of these glycols can also be employed, such as the acetates, propionates, and butyrates of these and similar glycols. Suitable ether glycols which can be employed instead of the polymethylene glycols or in conjunction therewith include diethylene glycol, triethylene glycol, tetraethylene glycol, bis (4-hydroxybutyl)ether, bis(3-hydroxypropyl) ether, and similar ether glycols.

When preparing high melting polyesters for the manufacture of synthetic fibers, the amount of aliphatic ether glycol is desirably minimized. Furthermore, the aromatic diacids or diesters preferably contain only p,p' linkages when highly polymeric linear polyesters are desired.

When polyesters are prepared in accordance with this invention, the reaction is desirably effected under an inert atmosphere, and preferably under anhydrous conditions. The reaction is effected at atmospheric pressure, and at an elevated temperature for a period of about 1 hour. Thereafter it is usually desirable to reduce the pressure on the reaction mixture to below about 15 mm. Hg and to raise the temperature of the reaction mixture for a period of from 1 to 6 hours. This permits any alcohol or other volatile material to distill out of the highly viscous polymer melt.

The polymers thus obtained can then be employed in the preparation of fibers or other articles by the usual methods. The polyesters embodying this invention are especially suitable for conversion into fibers by melt spinning methods. The spun fibers are usually drafted and heat treated in accordance with well known practice to give high melting synthetic fibers of excellent tensile strength.

The modified polyesters of this invention can also be employed for making sheets and films, or for the manufacture of molding products and similar materials. The polymers are readily dyed with cellulose acetate type dyes and also show some affinity for certain classes of acid wool, direct cotton and vat dyes. Although a dyeing assistant is not necessary, one can be used when particularly heavy or dark shades are desired.

The invention is illustrated by the following examples of certain preferred embodiments thereof. The examples are included merely for purposes of illustration and are not intended to limit the scope of the invention unless otherwise specifically indicated.

*Example 1*

Four hundred and twenty grams (1.0 mole) of p,p'-sulfonyldibenzoic acid dibutyl ester, 36 g. (0.15 mole) of 5-dimethylaminoisophthalic acid dimethyl ester, and 250 g. (2.4 moles) of pentamethylene glycol are placed in a reaction vessel equipped with a stirrer, a short distillation column, and an inlet for purified hydrogen. A solution of 0.1 g. sodium titanium butoxide in 5 cc. of butanol was added as catalyst. The mixture was stirred at 200–210° C. in a stream of hydrogen. A mixture of methyl alcohol and butyl alcohol distilled as the ester-interchange took place. The distillation of the alcohols practically stopped after 1 hour. The temperature was then raised to 260° C. and held for 30 minutes. A vacuum of 0.1 mm. was applied and the mixture was stirred at 260–265° C. for 1.5 hours. A high viscosity polyester was obtained. The inherent viscosity, as measured in 60 phenol–40 tetrachlorethane, was 0.75. Fibers were spun by extruding the melted polymer through a multi-hole spinneret. The fibers stuck to the hot bar at 215–220° C. They could be dyed to dark shades with cellulose acetate dyes in a boiling water bath.

*Example 2*

Similar results were obtained employing hexamethylene glycol instead of pentamethylene glycol in the process of the preceding example.

*Example 3*

A mixture of 420 g. (1.0 mole) of p,p'-sulfonyldibenzoic acid dibutyl ester, 41 g. (0.17 mole) of dimethylaminoterephthalic acid dimethyl ester and 250 g. (2.4 moles) of pentamethylene glycol was condensed to form a modified linear polyester as described in Example 1. The polymer was spun into fibers which stuck to the hot bar at 210–215° C. and which dyed well with cellulose acetate type dyes in a boiling water bath, or with acid wool dyes.

*Example 4*

One hundred and ninety-four g. (1.0 mole) of dimethyl terephthalate, 60 g. (0.25 mole) of dimethylamino-terephthalic acid dimethyl ester, and 190 g. (3.0 moles) of ethylene glycol were placed in a reaction vessel as described in Example 1. A solution of 0.15 g. lithium aluminum ethylate in 5 cc. ethyl alcohol was added as catalyst. The mixture was stirred at 190° C. in an atmosphere of purified nitrogen. Methyl alcohol distilled during a period of 2 hours as the ester-interchange took place. The mixture was then stirred at 200–210° C. for 3 hours, after which the temperature was raised to 260–270° C. and held for one hour. A vacuum of 0.3 mm. was applied and the melt was stirred at 260–270° for 4 hours. The product had an inherent viscosity of 0.72 as measured in a solution of 60 phenol-40 tetrachlorethane. Fibers were spun from the polyester by extrusion in a melt-spinning apparatus. They stuck to the hot bar at 180–190° C. The fibers dyed well with cellulose acetate dyes, or with acid wool dyes.

*Example 5*

Four hundred and twenty grams (1.0 mole) of p,p'-sulfonyldibenzoic acid dibutyl ester, 27 g. (0.10 mole) of diethylamino-terephthalic acid dimethyl ester, and 208 g. (2.0 moles) of pentamethylene glycol were placed in a reaction vessel as described in Example 1. A solution of 0.2 g. sodium aluminum butoxide in 10 cc. of butyl alcohol was added as catalyst. A heating schedule similar to that described in Example 1 was employed. A high viscosity polyester was obtained. Fibers spun from the product stuck on the hot bar at 220–230° C. They dyed well with cellulose acetate dyes and acid wool dyes.

*Example 6*

Similar results were obtained using 0.15 mole proportion of 4,4'-dicarboxy-3,3'-dimethylamino-diphenylsulfone instead of the diethyl of the diethylamino terephthalate in the process of Example 5.

*Example 7*

A polyester was made having the composition: 0.88 mole p,p'-sulfonyldibenzoic acid, 0.12 mole 4,4'-dicarboxy-3,3'-diethylamino-diphenylsulfide, 1.0 mole hexamethylene glycols. It gave fibers that stuck to the hot bar at 200–210° C. The fibers dyed well with cellulose acetate dyes.

*Example 8*

A polyester was made having the composition: 0.86 mole terephthalic acid, 0.14 mole 5-dimethylamino-isophthalic acid, 1.0 mole ethylene glycol. It gave fibers that dyed well with cellulose acetate dyes.

*Example 9*

A polyester was made having the composition: 0.84 mole p,p'-sulfonyldibenzoic acid, 0.16 mole 4,4'-dicarboxy-3,3'-dimethylamino-diphenyl methane, and 1.0 mole octamethylene glycol. It gave fibers that dyed well with cellulose acetate or acid wool dyes.

*Example 10*

A polyester was made having the composition: 0.85 mole 1,2-di(p-carboxyphenyl) ethane, 0.15 mole 4,4'-dicarboxy-3,3'-dimethylamino-diphenylethane, and 1.0 mole butanediol. The fibers dyed well with cellulose acetate dyes.

*Example 11*

A polyester was made having the composition: 0.82 mole 1,2-di(p-carboxyphenoxy) ethane, 0.18 mole dimethylamino-terephthalic acid, and 1.0 mole ethylene glycol. The polymer fibers dyed well with acid wool dyes.

Similar results are obtained using other combinations of a polybasic organic acid, a polyhydric alcohol, and an aromatic dialkylamino dibasic acid as defined herein whether free or esterified. As can be seen from the examples, either or all of the dibasic acid, and the polyhydric alcohol, and the dialkylamino dibasic acid can be esterified in practicing this invention, or one or more can be in the unesterified form. Mixtures of any of these or similar reactants can be employed in practicing the invention to give polymers having desired properties.

The polymers embodying the invention can be prepared in accordance with the usual processes for making polyesters, including either batch or continuous processes as desired. The products thus obtained are particularly valuable for preparing synthetic fibers of good mechanical properties and improved affinity for dyes. The modified polyesters, however, can be employed for making clear films which can be employed in the manufacture of photosensitive materials such as either black-and-white or color photographic film. Such films can be prepared in accordance with well known practice, either by deposition of a molten layer onto a suitable film-forming surface, or by deposition from a suitable solvent onto a rotating drum. The modified polymers of this invention can also be used for any of the other applications in which the prior polyesters could be used, since the desirable properties of the copolymer are retained in the terpolymer of this invention.

When using the modified polymers of this invention, any of the well known compounding ingredients which are ordinarily employed in conjunction with synthetic resins can be used, and the polymers can be admixed with similar or dissimilar polymers as desired. Fibers are most conveniently prepared from these polymers by melt-spinning processes, but the polymers can be spun from a solution in a suitable organic solvent such as dimethylformamide or dimethylacetamide if desired, in accordance with processes well known to the art.

Although the invention has been described in considerable detail with particular reference to certain preferred embodiments thereof, variations and modifications can be effected within the spirit and scope of the invention as described hereinabove, and as defined in the appended claims.

We claim:
1. The method of preparing improved linear polyesters which comprises reacting together at 200–300° C. to an inherent viscosity of at least 0.4, a mixture of a compound (1) selected from the group consisting of dihydric alcohols of 2–12 carbon atoms, a compound (2) free of nuclear amino substituents and selected from the group consisting of p-dicarboxylic aromatic acids and $C_1$–$C_{10}$ alkyl esters thereof, and an aminoacid (3) selected from the group consisting of compounds of the formulas

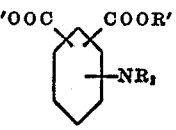

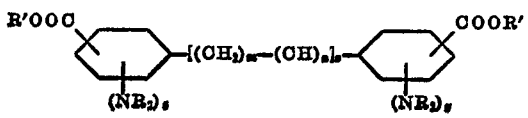

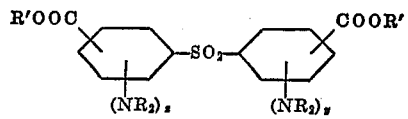

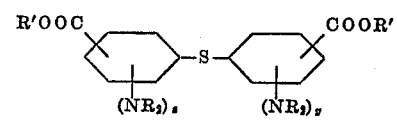

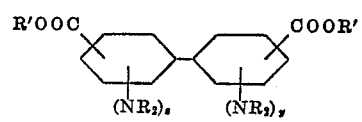

wherein R is a member of the group consisting of methyl and ethyl groups, R' is a member of the group consisting of hydrogen and alkyl groups of 1–10 carbon atoms, and m, n, x, y and z are members of the group consisting of 0 and 1, at least one of y and z being 1, the mole percent of said compound (1) being at least 1.3 times the combined mole percent of (2) and (3) and the aminoacid (3) amounting to 5–25 mole percent of (1), (2) and (3).

2. A linear polyester of a compound (1) selected from the group consisting of dihydric alcohols of 2–12 carbon atoms, a compound (2) free of nuclear amino substituents and selected from the group consisting of p-dicarboxylic aromatic acids and $C_1$–$C_{10}$ alkyl esters thereof, and an aminoacid (3) selected from the group consisting of compounds of the formulas

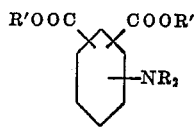

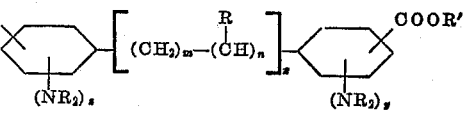

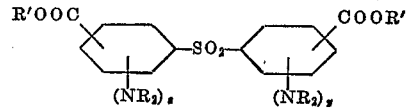

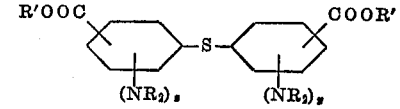

and

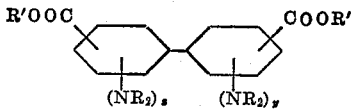

wherein R is a member of the group consisting of methyl and ethyl groups, R' is a member of the group consisting of hydrogen and alkyl groups of 1–10 carbon atoms, and m, n, x, y, and z are members of the group consisting of 0 and 1, at least one of y and z being 1, the mole percent of said compound (1) being at least 1.3 times the combined mole percent of (2) and (3) and the aminoacid (3) amounting to 5–25 mole percent of (1), (2) and (3), said polyester having an inherent viscosity of at least 0.4.

3. Synthetic fiber of the polyester of claim 2.

References Cited in the file of this patent
UNITED STATES PATENTS

| | | |
|---|---|---|
| 2,597,965 | Adams | May 27, 1952 |
| 2,688,008 | Chaney et al. | Aug. 31, 1954 |
| 2,739,958 | Lincoln et al. | Mar. 27, 1956 |